Inventor
Carl A. May,
By Clarence A. O'Brien
Attorney

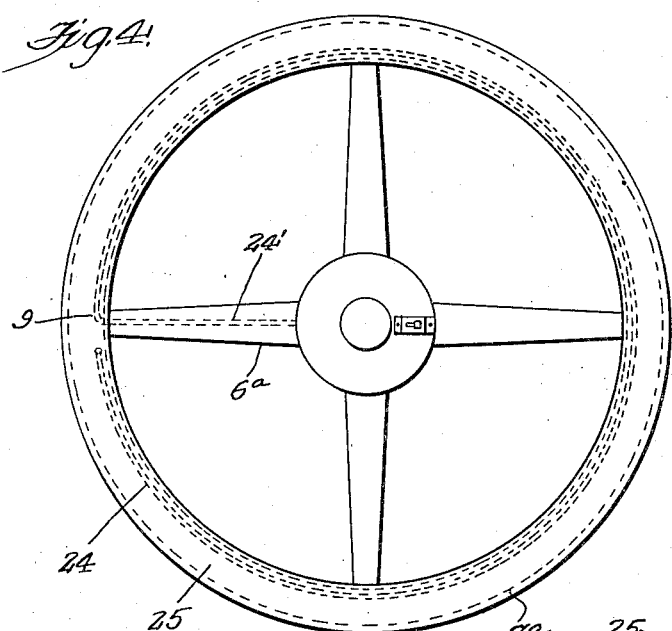
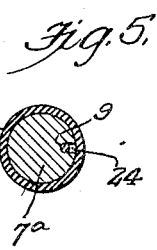
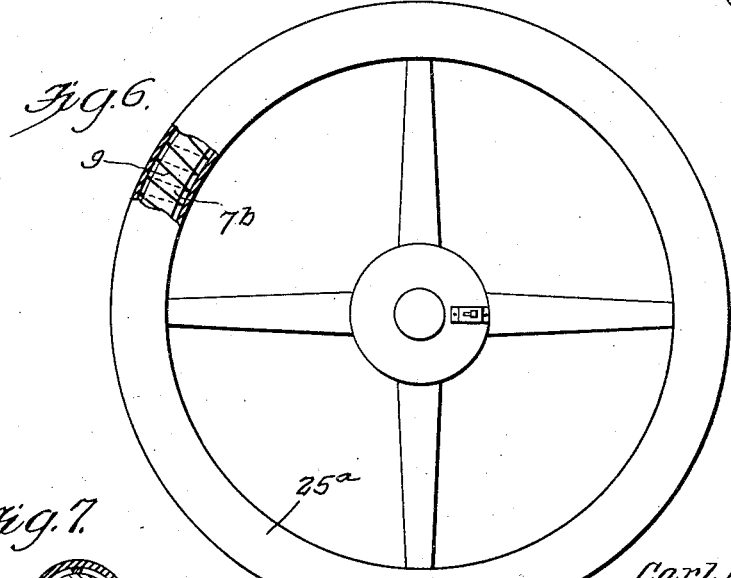
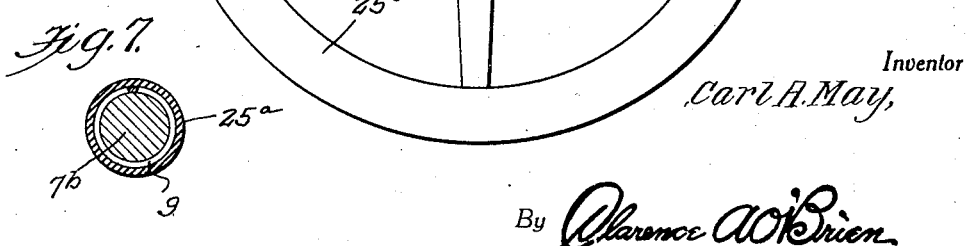

Patented Nov. 14, 1933

1,934,988

UNITED STATES PATENT OFFICE 1,934,988

HEATER FOR STEERING WHEELS

Carl A. May, Akron, Ohio

Application January 2, 1931, Serial No. 506,251
Renewed May 31, 1933

3 Claims. (Cl. 219—19)

This invention relates broadly to steering wheels, and has more particular reference to an electric heater adapted to be incorporated in the steering wheel for maintaining the driver's hands warm during cold and inclement weather.

A still further object of the invention is to provide an electrical heater for use in conjunction with steering wheels of motor vehicles and like vehicles, the heating element being adaptable to such steering wheel structures as include hollow spokes and rim or solid spokes and rim, either of which construction may now be found as forming a part of the steering apparatus of the automobile.

Another salient object of the invention is to provide a heating element of the character above mentioned which also includes a manually operable control switch therefor that may be mounted on the steering wheel within convenient reach of the operator and without requiring a complete removal of the hand from the steering wheel to actuate the switch.

Other objects and advantages of the invention will become apparent during a study of the following description, taken in connection with the accompanying drawings wherein:

Figure 4 is a plan view of a modified form of the invention.

Figure 5 is a transverse sectional view therethrough.

Figure 6 is a view similar to Figure 4 of still another form of the invention certain parts being shown broken away.

Figure 7 is a transverse sectional view therethrough.

With reference more in detail to the drawings, it will be seen that the invention is applicable to such types of steering wheels as include a hub 5 having spokes 6 radiating therefrom and connected at their outer ends to a rim 7. The steering wheel among other essential parts also includes the usual apertured disk D which provides a support for the push button B for controlling the horn of the automobile in a manner readily apparent.

Figure 1:
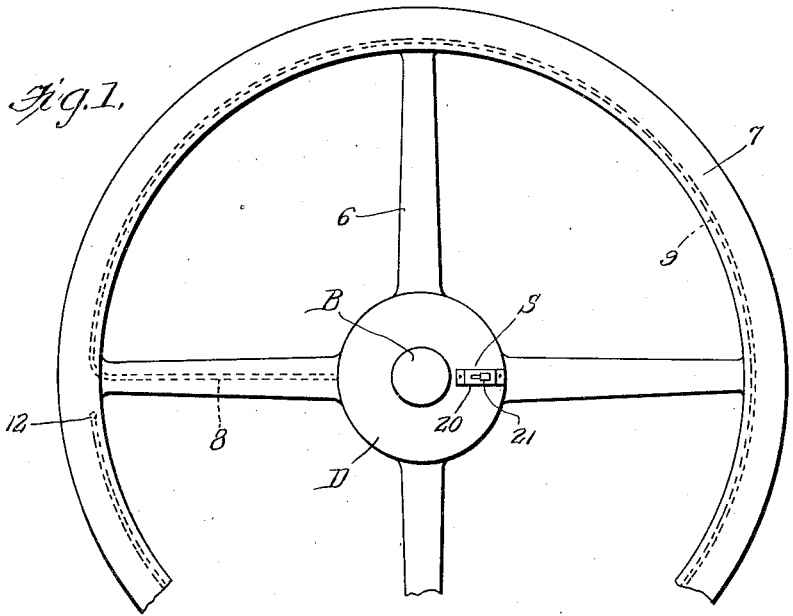
Figure 1 is a plan view of a portion of a steering wheel having a heater incorporated therein according to the present invention.
Figure 2:
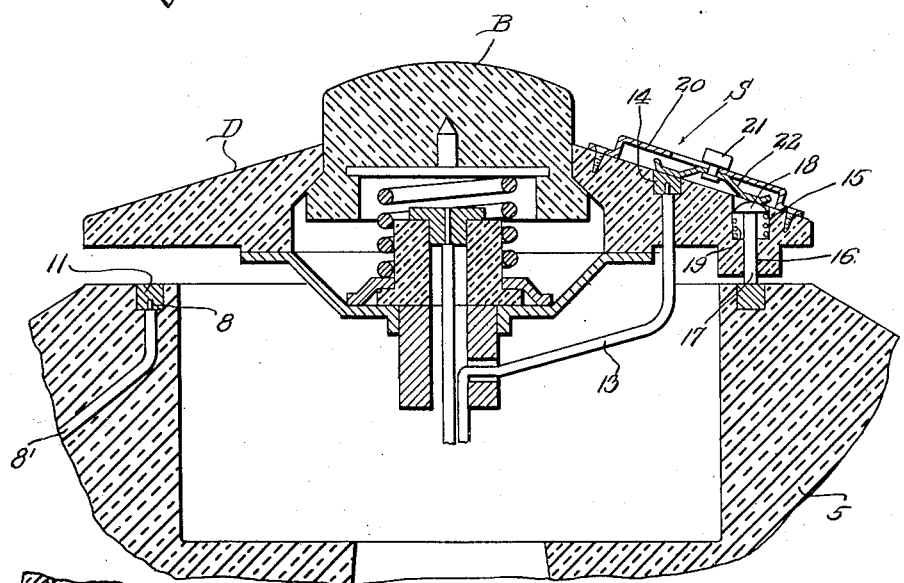
Figure 2 is a fragmentary sectional view taken through the hub of the steering wheel.
Figure 3:
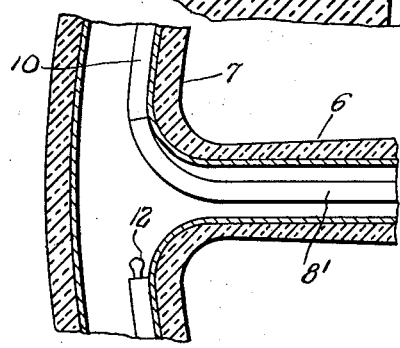
Figure 3 is a fragmentary detail sectional view taken through a portion of the rim and one of the spokes of the steering wheel.

In Figures 1 to 3 inclusive I have shown the invention as applied to that type of steering wheel wherein the spokes 6 and rim 7 thereof are of hollow construction. In this connection, it will be seen that the heating unit consists of a single strand of soft wire 9 suitably encased within an asbestos tube 10 and arranged within the hollow rim 7 to extend about the rim for substantially the entire circumference of the rim.

Mounted in the upper portion of the hub 5 is a contact ring 11 with which one end of a primary wire 8 is suitably connected, said wire 8 at its opposite end having suitable electrical connection with one end of the heating wire 9. The primary wire 8 is also enclosed within a suitable casing 8'. The free end of the heating wire 9 is suitably grounded within the rim 7 as at 12 adjacent the particular spoke 6 through which extends the primary wire 8.

Leading upwardly through the hub 5 of the steering wheel is a primary electrical conductor wire 13, leading from any suitable source of electrical energy such, for example, as the generator (not shown) of the automobile. At its upper end, the wire 13 is suitably secured to a contact member 14 embedded in the disk D.

The disk D adjacent the contact member 14 is provided with a socket member 15 that communicates with a vertical bore 16. A vertically movable contact member 17 is slidable in said bore and has its lower end adapted to contact with contact ring 11. At its upper end the member 17 is provided with a head 18 operable within the socket 15. A coil spring 19 is arranged within said socket and one end of the coil spring bears against the head 18 for normally urging the contact member 17 upwardly and out of engagement with contact ring 11.

For controlling the electrical circuit through the heater, there is provided a manually operated switch designated generally by the reference character S. The switch S may be of any preferred and suitable type, but for the sake of example, and as herein shown, I employ such a type of switch as includes a casing 20 suitably secured to the disk D adjacent contact 14 and socket 15.

Operable in a slot in a top wall of the casing 20 is a control button 21 that at its inner end is provided with a metallic bridge member 22 one end of which is adapted to engage the contact member 14, and the other end of which is adapted to engage the head 18 for urging member 17 downwardly against the action of the spring 19 into electrical contact with the contact ring 11 for closing the circuit to the heater 9 for heating the rim of the steering wheel (see Figure 2).

Obviously, to break the circuit to the heater, the push button 21 is moved toward the left of Figure 2 thus moving the member 22 out of contact with the contact members 14 and 17.

Manifestly, during cold weather, the operator's hands gripping the steering wheel are very apt to become cold and numb, greatly handicapping the operator in the manipulation of the steering wheel. With a steering wheel equipped with a heater embodying the features of the present invention, it will be readily appreciated that the operator may conveniently turn on the switch S for closing the circuit to the electrical heater. Heat then will be generated from wire 9 and transmitted to the steering wheel resulting in the warming of the steering wheel and the hands of the operator.

In Figures 4 and 5 of the drawings, I have shown a slightly modified form of the invention; the invention as herein shown being used with that type of steering wheel wherein the spokes 6a thereof and rim 7a, unlike the steering wheel structure shown in Figures 1 to 3 inclusive, are solid. For the purpose of accommodating the electrical heating element on this type of steering wheel, the rim 7a is provided with an annular groove 24 for accommodating the heating wire 9 and one of the spokes 6a of the steering wheel is provided with a longitudinally extending groove 24' for accommodating the primary wire 8 that connects the heating wire 9 with the contact ring 11.

For closing the groove 24, and preventing contact of the hand with the heating wire 9 the rim 7 is provided with an outer casing 25 that may be formed of rubber or any other suitable material.

As shown in Figure 6, instead of providing the groove 24 in the rim 7a when the rim is of solid construction, the heating wire 9 is arranged in the nature of a coil being wrapped or convoluted about the rim 7b as clearly shown. The rim 7b together with the heating wire 9 is entirely enclosed within a casing 25a similar to the casing 25.

It is thought, from the foregoing description, taken in connection with the accompanying drawings that a clear understanding of the operation, structure, utility and advantages of an invention of this character will be had, and it is to be further understood that the invention is susceptible to additional modifications, changes and improvements coming within the scope of the claims hereunto appended.

Having thus described my invention, what I claim as new is:

1. A steering wheel comprising in combination a spider the spokes and rim of which are substantially hollow; a sheathing encasing the spokes and rim; a circumferentially extending resistance wire within the rim and having one end welded to the wall of the rim adjacent one of the spokes, and the other end concealed within said one spoke, and a tubular insulating jacket surrounding the resistance wire; said jacket being of materially less cross sectional diameter than the cross sectional diameter of said rim, and also having circumferential contact with the wall of the rim at the inner circumferential side of the rim.

2. An electrically heated steering wheel including in combination, a hollow substantially circular rim, and a circumferentially extending resistance wire arranged interiorly of the rim, in a substantially circumferentially stretched condition and immediately adjacent the wall of the rim at the inner circumferential side of the rim; said wire having one end thereof electrically connected directly with the wall of the rim.

3. A steering wheel comprising in combination, a rim having a tubular core and a sheathing of composition material covering the core; and a resistance wire arranged within the core and extending circumferentially thereof immediately adjacent the wall of the core at the inner circumferential side of the core, said wire having one of its ends welded to the core and the other of its ends connected to a conductor wire at a point proximate to the first named end of the wire; and an insulating jacket surrounding said resistance wire.

CARL A. MAY.